(12) United States Patent
Mainini et al.

(10) Patent No.: US 10,492,593 B2
(45) Date of Patent: Dec. 3, 2019

(54) CLIP-SLIDER FOR BODY-WORN AUDIO DEVICES

(71) Applicant: Plantronics, Inc., Santa Cruz, CA (US)

(72) Inventors: Matthew J Mainini, Santa Cruz, CA (US); Terry M Carr, Santa Cruz, CA (US); Joseph (Hungmin) Liang, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/662,164

(22) Filed: Jul. 27, 2017

(65) Prior Publication Data

US 2019/0029404 A1    Jan. 31, 2019

(51) Int. Cl.
*A45F 5/02* (2006.01)
*F16B 2/10* (2006.01)
*F16B 2/22* (2006.01)

(52) U.S. Cl.
CPC .......... *A45F 5/02* (2013.01); *F16B 2/10* (2013.01); *F16B 2/22* (2013.01); *A45F 2200/0508* (2013.01)

(58) Field of Classification Search
CPC .............. A45F 5/02; F16B 2/10; F16B 2/22
See application file for complete search history.

(56) References Cited

U.S. PATENT DOCUMENTS

| | | | |
|---|---|---|---|
| 292,412 A * | 1/1884 | Covell | B43K 23/001 |
| | | | 211/69.8 |
| 2,506,783 A * | 5/1950 | Fauteux, Jr. | D06F 55/00 |
| | | | 24/334 |
| 3,780,402 A * | 12/1973 | Takabayashi | A41F 3/02 |
| | | | 24/507 |
| 4,707,906 A * | 11/1987 | Posey | A61G 7/0503 |
| | | | 128/DIG. 26 |
| 5,129,126 A * | 7/1992 | Huang | A44B 99/00 |
| | | | 224/669 |
| 5,666,702 A * | 9/1997 | Ming-Chieh | B42F 1/006 |
| | | | 24/338 |
| 6,283,348 B1 * | 9/2001 | Wang | A45F 5/02 |
| | | | 224/197 |
| D477,029 S * | 7/2003 | Korowitz | D19/65 |
| 6,804,866 B2 * | 10/2004 | Lemke | A61M 16/0683 |
| | | | 24/3.11 |
| D594,225 S * | 6/2009 | Leung | D3/218 |
| 7,699,198 B2 * | 4/2010 | Sirichai | A45F 5/00 |
| | | | 224/162 |
| 7,778,435 B2 * | 8/2010 | Smith | H04R 1/10 |
| | | | 181/135 |
| 8,381,359 B1 * | 2/2013 | McArdle | A45F 5/02 |
| | | | 2/209.13 |
| D682,256 S | 5/2013 | Murchison et al. | |

(Continued)

FOREIGN PATENT DOCUMENTS

WO    WO 2009/082325 A1    7/2009

*Primary Examiner* — Robert Sandy
*Assistant Examiner* — David M Upchurch
(74) *Attorney, Agent, or Firm* — Jeremy S. DesRosier (57) ABSTRACT

A clip-slider includes a first clip member and a second clip member. The second clip member is pivotally connected to the first clip member. Also, the second clip member includes a semi-enclosed tailpiece. The semi-enclosed tailpiece extends from a rear portion of the second clip member. The clip-slider may be used to attach an audio cable to clothing, or to cinch the audio cable.

16 Claims, 4 Drawing Sheets

(56) References Cited

U.S. PATENT DOCUMENTS

| | | | |
|---|---|---|---|
| D685,343 S * | 7/2013 | Fletcher | D14/205 |
| 8,777,170 B2 * | 7/2014 | Gilbert | A63H 3/50 |
| | | | 224/666 |
| 8,948,824 B2 * | 2/2015 | Filson | H04M 1/0202 |
| | | | 224/667 |
| D742,354 S * | 11/2015 | McNamara | D14/205 |
| 9,232,826 B2 * | 1/2016 | Vermillion | A42B 3/04 |
| 2003/0229971 A1 | 12/2003 | Coyne | |
| 2004/0155079 A1 | 8/2004 | Shetler et al. | |
| 2006/0283898 A1 * | 12/2006 | Tages | A45F 5/00 |
| | | | 224/269 |
| 2007/0095991 A1 * | 5/2007 | Fall | A45F 5/02 |
| | | | 248/229.26 |
| 2010/0254123 A1 | 10/2010 | Brown | |
| 2011/0139950 A1 | 6/2011 | Wai et al. | |

\* cited by examiner

FIG. 3B

CLIP-SLIDER FOR BODY-WORN AUDIO DEVICES

FIELD

The present disclosure relates generally to accessories for body-worn audio devices. More particularly, the present disclosure relates to a clip-type device for securing the audio cable of a body-worn audio device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Body-worn audio devices, such as headphones and headsets, often include audio cables connecting the left-ear and right-ear speakers, and/or an audio cable for connecting the speaker(s) to an audio source. During use, the audio cable may hang from the wearer's ears in a manner that frustrates the wearer and negatively affects the listening experience. For example, a loose audio cable may bounce in a manner that annoys the wearer, or even destabilizes the body-worn audio device such that it falls from the wearer's ears. Also, a loose audio cable may be easily snagged by environmental objects and pulled from the wearer's ears. Still yet, the perceived acoustics of the body-worn audio device may be negatively impacted if the speakers are not securely positioned adjacent to the wearer's ear canals, or due to cable rubbing noise transferred into the ear through the cable. Accordingly, some users may constantly adjust or reposition the audio cable such that it doesn't snag on objects or otherwise restrict his or her movement.

SUMMARY

In general, in one aspect, a clip-slider is disclosed. The clip-slider includes a first clip member and a second clip member. The second clip member is pivotally connected to the first clip member. Also, the second clip member includes a semi-enclosed tailpiece. The semi-enclosed tailpiece extends from a rear portion of the second clip member. The clip-slider may be used to attach an audio cable to clothing, or to cinch the audio cable.

The details of one or more implementations are set forth in the accompanying drawings and the description below. Other features will be apparent from the description and drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

Disclosed herein are dual-use clip-slider devices. As described below, a clip-slider is generally embodied as a clip-type device that may be used both for attaching an audio cable to a wearer's clothing, or for slidably cinching the audio cable in a manner that allows for easy adjustment of slack in the audio cable. For example, a clip-slider may fixedly hold an audio cable while attached to a shirt-collar or shirt-sleeve; or the clip-slider may hold the audio cable at two separate points that are separated by a loop of audio cable, and allow adjustment of the loop by moving the cable relative to the clip-slider. Moreover, the clip-slider may readily transition between the two uses without modification. Accordingly, a single clip-slider may subsume the role of two different devices.

Figure 1A:
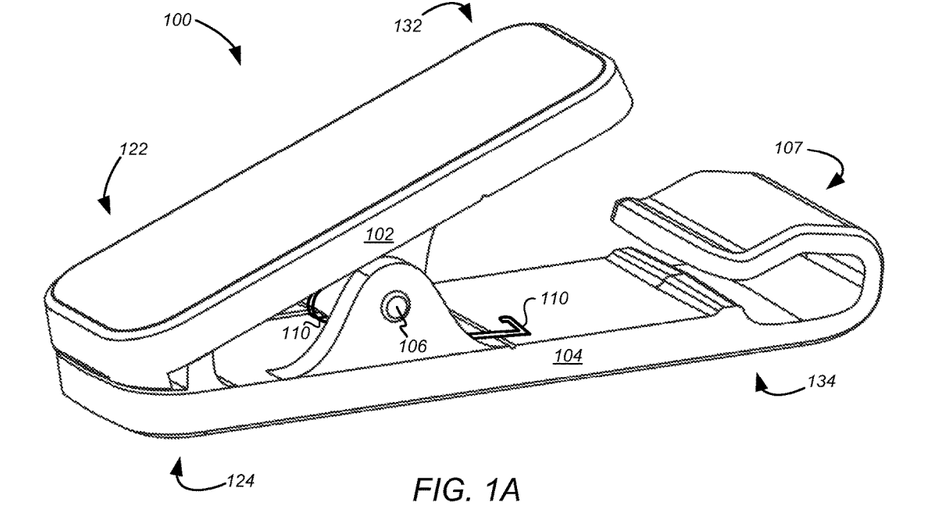
FIGS. 1A and 1B are perspective views depicting a clip-slider, in accordance with one or more embodiments of the invention.
Figure 1B:
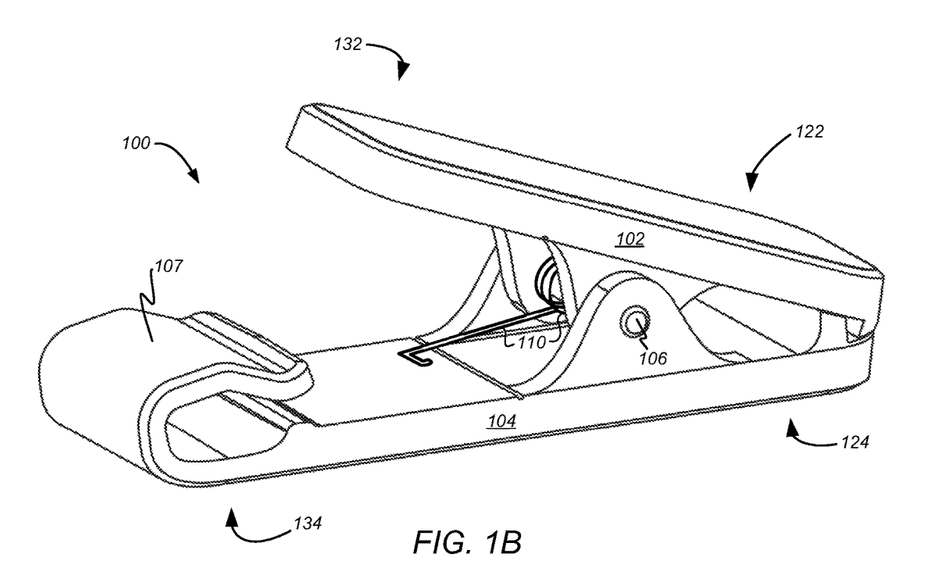

FIGS. 1A and 1B show perspective views of a clip-slider 100, according to one or more embodiments. Although the elements of the clip-slider 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 1A and 1B may be omitted, repeated, and/or substituted. Accordingly, various embodiments may lack one or more of the features shown. For this reason, embodiments of the invention should not be considered limited to the specific arrangements of elements shown in FIGS. 1A and 1B.

Referring now to FIGS. 1A and 1B, a clip-slider 100 is shown to include a first clip member 102 pivotally connected to a second clip member 104 at a pivot 106. As described herein, the pivot 106 includes any structure about which one or both of the first clip member 102 and the second clip member 104 may rotate. For example, the pivot 106 may include a pin that ensures the first clip member 102 is only able to move relative to the second clip member 104 about a single axis of the pin.

The first clip member 102 and the second clip member 104 are generally biased in a closed position, such that a front portion 122 of the first clip member 102 and a front portion 124 of the second clip member 104 apply a mutually compressive force on each other. In one or more embodiments, a spring 110 biases the first clip member 102 and the second clip member 104 in the closed position. As illustrated in FIGS. 1A and 1B, the spring 110 is located about the pivot 106, and applies outward pressure to internal surfaces of the first clip member 102 and the second clip member 104 at points behind the pivot 106 relative to the front portions 122 and 124. The spring may include a metal or plastic coil spring. As described herein, the front portion 122 of the first clip member 102 includes any length of the first clip member 102 located on a first side of the pivot 106, and a rear portion 132 of the first clip member 102 includes any length of the first clip member 102 located on a second side opposite the pivot 106. Similarly, the front portion 124 of the second clip member 104 includes any length of the second clip member 104 located on the first side of the pivot 106, and a rear portion 134 of the second clip member 104 includes any length of the second clip member 104 located on the second side opposite the pivot 106.

Thus, application of pressure to the rear portion 132 of the first clip member 102 and/or the rear portion 134 of the second clip member 104 by, for example, a user's fingers squeezing the clip-slider 100, may compress the spring 110 and open the clip-slider 100, thereby allowing insertion of an object between the front portions 122 and 124 of the clip members 102 and 104, respectively. In one or more embodiments, the object may include, for example, an item of clothing, such as a shirt-collar, a shirt-sleeve, a hood, or any other piece of clothing. In one or more embodiments, the object may include a length of audio cable, such as, for example, the cord of a headset or pair of headphones.

Still referring to FIGS. 1A and 1B, the first clip member 102 and the second clip member 104 have substantially the same width. In one or more embodiments, the first clip member 102 and the second clip member 104 may be between 4 mm and 15 mm wide. For example, the first clip member 102 and the second clip member 104 may be approximately 7 mm wide. The first clip member 102 and the second clip member 104 may be between 10 mm and 40 mm long. In one or more embodiments, the second clip member 104 may be between 0 mm and 10 mm longer than the first clip member 102. For example, the first clip member 102 may be approximately 19 mm long, and the second clip member 104 may be approximately 25 mm long, such that the second clip member 104 is approximately 6 mm longer than the first clip member 102.

Still yet, the second clip member 104 includes a semi-enclosed tailpiece 107 extending from the rear portion 134. In one or more embodiments, the semi-enclosed tailpiece 107 includes a C- or U-shaped portion of the second clip member 104 that extends rearward from the rear portion 134 of the second clip member 104, curving inwards towards the first clip member 102, and is configured to partially enclose and securely hold an audio cable. In one or more embodiments, the semi-enclosed tailpiece may curve away from the first clip member 102.

In one or more embodiments, the first clip member 102 may be made of any suitable plastic or metal material. For example, the first clip member 102 may be formed by an injection molding process. Similarly, the second clip member 104 may be a plastic or metal member, formed by any suitable process. The second clip member 104 may be manufactured such that the semi-enclosed tailpiece 107 is integrally formed with the second clip member 104. Of course, however, it is contemplated that the semi-enclosed tailpiece 107 may be manufactured separately from, and subsequently joined with, the second clip member 104.

Figure 2A:
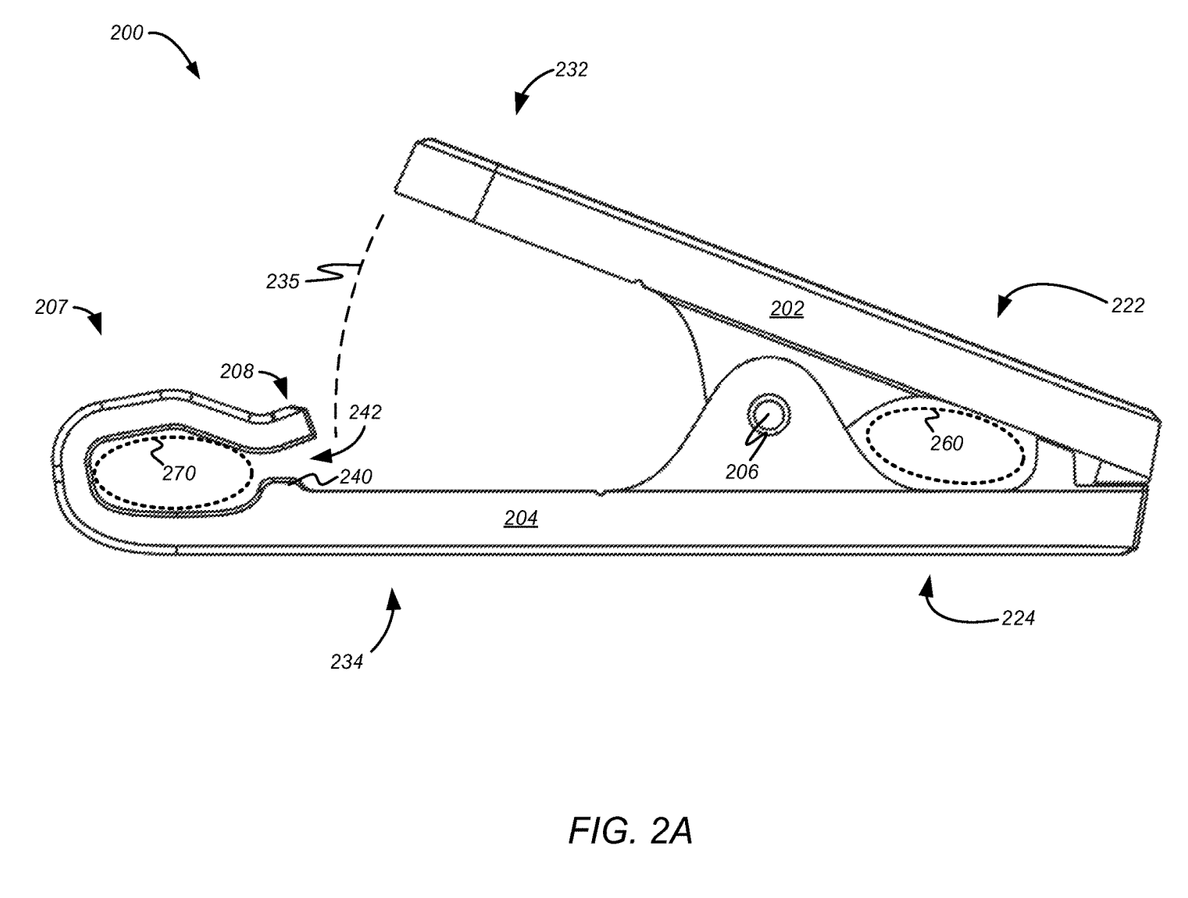
FIG. 2A is a side view depicting a clip-slider, in accordance with one or more embodiments of the invention.

FIG. 2A shows a side view of a clip-slider 200, according to one or more embodiments. Although the elements of the clip-slider 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2A may be omitted, repeated, and/or substituted. Accordingly, various embodiments may lack one or more of the features shown. For this reason, embodiments of the invention should not be considered limited to the specific arrangements of elements shown in FIG. 2A.

As shown in FIG. 2A, the clip-slider 200 includes a first clip member 202, a second clip member 204, and a pivot 206, each of which may be substantially identical to the first clip member 102, the second clip member 104, and the pivot 106, respectively, described in the context of FIGS. 1A and 1B. The first clip member 202 includes a front portion 222 and a rear portion 232. Similarly, the second clip member 204 includes a front portion 224 and a rear portion 234.

When the clip-slider 200 is closed, the front portion 222 of the first clip member 202 and the front portion 224 of the second clip member 204 remain in contact, and define a first aperture 260. The first aperture 260 comprises an interspace between the two front portions 222 and 224, such that the front portions 222 and 224 are configured to enclose and securely hold an audio cable. As illustrated in FIG. 2A, the first aperture 260 is defined such that the front portions 222 and 224 will fully enclose an audio cable within the first aperture 260 when the clip-slider 200 is closed. It is contemplated that, in other embodiments, an audio cable held by the front portions of a clip-slider may not be fully enclosed. For example, in such embodiments, the audio cable may be only partially enclosed by the front portions of the clip-slider.

Referring again to FIG. 2A, the second clip member 204 includes a semi-enclosed tailpiece 207 extending from the rear portion 234. As shown in FIG. 2A, the semi-enclosed tailpiece 207 extends back from the rear portion 234 of the second clip member 204 in a direction along the longitudinal axis of the second clip member 204, and curves upward in a direction generally perpendicular to the longitudinal axis of the second clip member 204, towards the first clip member 202. Furthermore, the semi-enclosed tailpiece 207 curves back inwards, towards the pivot 206. In this way, the semi-enclosed tailpiece 207 defines a second aperture 270. The second aperture 270 comprises a void defined by the semi-enclosed tailpiece 207, such that the semi-enclosed tailpiece 207 is configured to partially enclose and securely hold an audio cable within the second aperture 270. Such an audio cable may be inserted within and removed from the second aperture 270 by way of a gap 242 between a terminus of the semi-enclosed tailpiece 207 and the rear portion 234 of the second clip member 204. In one or more embodiments, the pivot 206 may be located within approximately 0 mm to 5 mm of a plane that intersects the center of the first aperture 260 and the center of the second aperture 270. For example, the pivot 206 may be located substantially on such plane.

As an option, the terminus of the semi-enclosed tailpiece 207 may include a flared portion 208. The flared portion 208 comprises a short terminal segment that extends away from the second clip member 204, and facilitates insertion of an audio cable into the second aperture 270 by partially increasing a size of the gap 242.

As an option, the second clip member 204 may include a ridge 240. The ridge 240 includes any protrusion from a surface of the rear portion 234 of the second clip member 204 that helps to retain an audio cable within the second aperture 270. As illustrated in FIG. 2A, the gap 242 is defined, at least in part, by the ridge 240 extending from the inner surface of the second clip member 204. Thus, a height of the gap 242 may be less than a height of the second aperture 270. In one or more embodiments, at least the semi-enclosed tailpiece 207 of the second clip member 204 is manufactured from a resilient material that allows the semi-enclosed tailpiece 207 to flex, such that the height of the gap 242 can temporarily increase when an audio cable is being inserted into or removed from the second aperture 270.

In one or more embodiments, the cross-sectional area of the first aperture 260 may be substantially equal to the cross-sectional area of the second aperture 270. As described herein, the cross-sectional areas of the apertures 260 and 270 are understood to comprise the areas of the apertures 260 and 270 as viewed in the side view of FIG. 2A. As used herein, when the cross-sectional area of the first aperture 260 is between 0% and 20% larger or smaller than the cross-sectional area of the second aperture 270, then the cross-sectional areas of the apertures 260 and 270 are substantially equal. For example, the cross-sectional area of the first aperture 260 may be approximately 10% to 15% smaller or larger than the cross-sectional area of the second aperture 270. In one or more embodiments, the cross-sectional areas of the first aperture 260 and the second aperture 270 are between approximately 2 $mm^2$ and 25 $mm^2$. For example, the cross-sectional area of the first aperture 260 may be between approximately 4 $mm^2$ and 7 $mm^2$, and the cross-sectional area of the second aperture 270 may be between approximately 4 $mm^2$ and 7 $mm^2$.

As an option, the clip-slider 200 may be provided with (e.g., sold with, etc.) a body-worn audio device. The body-worn audio device may include a corded headset or headphone assembly that requires a direct physical connection, by way of an audio cable, to an audio source. The body-worn audio device may include a wireless headset or headphone assembly (e.g., a Bluetooth headset, a DECT headset, etc.) with an audio cable connecting the left earphone and right earphone. Regardless of the type or style of the body-worn audio device, the apertures 260 and 270 of the clip-slider 200 may be sized to accommodate its audio cable. For example, both the apertures 260 and 270 may be configured to have a cross-sectional area that is slightly smaller than a diameter of the audio cable of the body-worn audio device. This may ensure that the clip-slider 200 can provide secure attachment to the audio cable without damaging the audio cable, while also allowing for free movement of the audio cable within the first aperture 260 and/or the second aperture 270 when the audio cable is pulled by a user.

As an option, an inner surface of the semi-enclosed tailpiece 207 may be polished. In other words, the inner surface of the semi-enclosed tailpiece 207 that defines the second aperture 270 may be smoother than an outer surface of the first clip member 202 and/or an outer surface of the second clip member 204. Still yet, the inner surface of the semi-enclosed tailpiece 207 that defines the second aperture 270 may be smoother than an inner surface of the front portion 222 of the first clip member 202 and/or an inner surface of the front portion 224 of the second clip member 204, which define the first aperture 260.

In one or more embodiments, the first clip member 202 is configured to avoid interfering with or contacting the semi-enclosed tailpiece 207 when the clip-slider 200 is opened. For example, when the clip-slider 200 is opened by squeezing the rear portion 232 of the first clip member 202 and/or the rear portion 234 of the second clip member 204, a terminus of the rear portion 232 follows an arc 235 about the pivot 206. While the clip-slider 200 is open, an audio cable may be inserted between or removed from the front portions 222 and 224 of the clip members 202 and 204, respectively. By maximizing the length of the arc 235, such that the rear portion 232 of the first clip member 202 can travel past the upper portion of the semi-enclosed tailpiece 207, easy insertion into and removal of an audio cable from between the front portions 222 and 224 may be facilitated. To this end, the semi-enclosed tailpiece 207 may be located entirely outside of the arc 235.

Figure 2B:
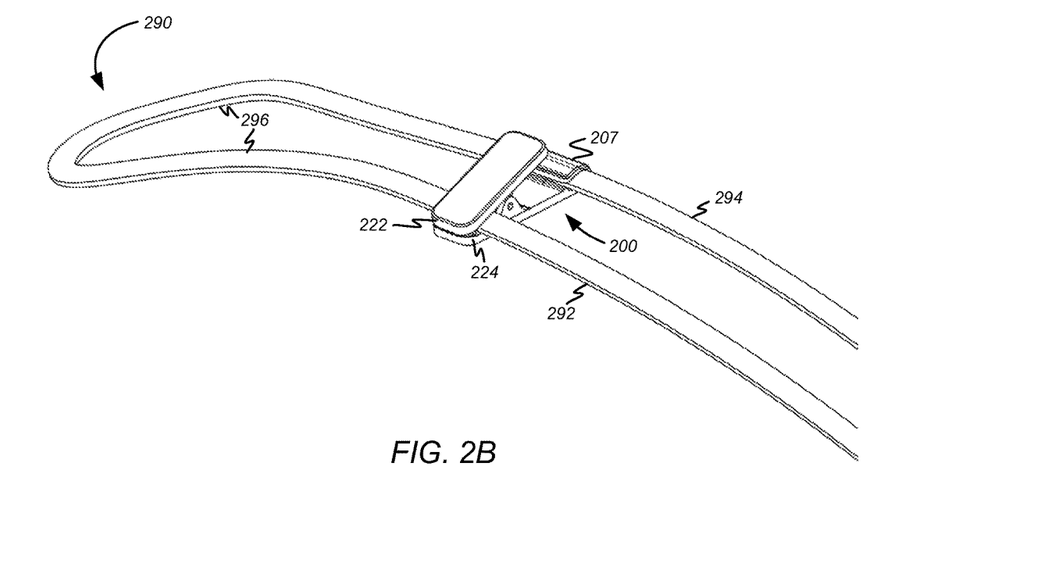
FIG. 2B is a perspective view depicting a clip-slider cinching an audio cable, in accordance with one or more embodiments of the invention.

FIG. 2B shows a perspective view of the clip-slider 200 being used to cinch an audio cable 290, according to one or more embodiments. As depicted in FIG. 2B, the audio cable 290 has been inserted between the front portions 222 and 224 of the clip-slider 200, and inserted into the semi-enclosed tailpiece 207 of the clip-slider 200, thereby forming a loop 296 of the audio cable 290 on a first side of the clip-slider 200. Extending from a second side of the clip-slider 200 are a first length 292 of the audio cable 290 and a second length 294 of the audio cable 290. In other words, the first length 292 of the audio cable 290 extends from the first aperture 260, as shown in FIG. 2A. Similarly, the second length 294 of the audio cable 290 extends from the second aperture 270 of the semi-enclosed tailpiece 207, as shown in FIG. 2A.

The size of the loop 296 may be adjusted, as well as the size of the lengths 292 and 294 of the audio cable 290, by moving the clip-slider 200 relative to, and along, the audio cable 290. For example, the loop 296 may be made smaller by a user pulling the clip-slider 200 towards the loop 296, while holding stationary the first and second lengths 292 and 294 of the audio cable 290. As another example, the loop 296 may be made smaller by a user pulling on the first and second lengths 292 and 294 of the audio cable 290 while holding stationary the clip-slider 200. Conversely, the loop 296 may be made larger by a user pulling the clip-slider 200 away from the loop 296, while holding the loop 296 of the audio cable 290. Also, the loop 296 may be made larger by a user pulling on the loop 296 of the audio cable 290 while holding stationary the clip-slider 200.

In one or more embodiments, an inertial force imparted by the clip members 202 and 204 on the audio cable 290 in first aperture 260 may be substantially equal to an inertial force imparted by the semi-enclosed tailpiece 207 on the audio cable 290 in the second aperture 270. In other words, the gram-force necessary to slide the audio cable 290 through the first aperture 260 may be substantially equal to the gram-force necessary to slide the audio cable 290 through the second aperture 270. These inertial forces may be a function of the cross-sectional areas of the apertures 260 and 270, tension applied by a spring of the clip-slider 200, and/or a smoothness of the interior surfaces of the apertures 260 and 270, as described above. Thus, when the audio cable 290 has been looped through both the first aperture 260 and the second aperture 270, and the audio cable 290 is pulled by a user, such that it moves relative to the clip-slider 200, the audio cable may slide through the first aperture 260 at approximately the same velocity it slides through the second aperture 270. In other words, the first and second lengths 292 and 294 of the audio cable 290 may shrink or grow at approximately the same rate. As a result, when the audio cable 290 is cinched by the clip-slider 200, the clip-slider 200 may facilitate symmetric adjustment of the loop 296, and the lengths 292 and 294, of the audio cable 290.

Figure 2C:
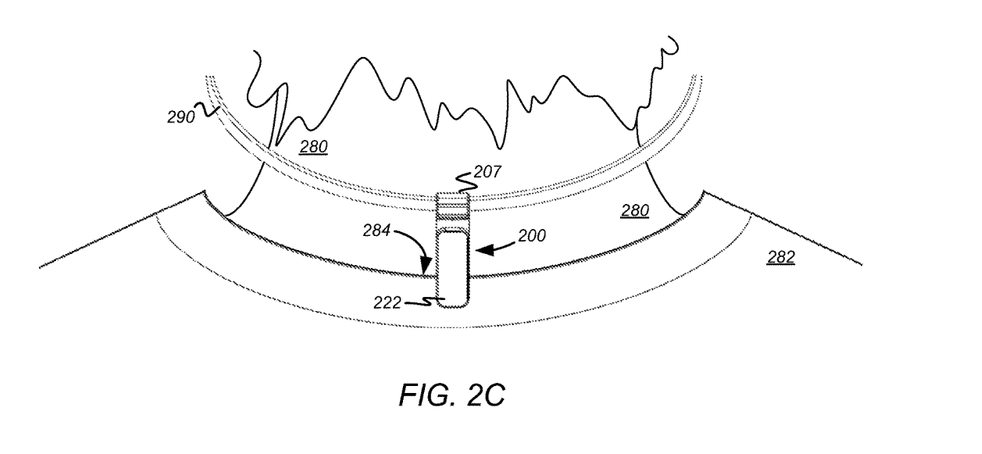
FIG. 2C is a top view of a clip-slider attaching an audio cable to clothing, in accordance with one or more embodiments of the invention.

FIG. 2C shows a top view of the clip-slider 200 attaching an audio cable to clothing, according to one or more embodiments. As depicted in FIG. 2C, and similar to the depiction of FIG. 2B, a portion of the audio cable 290 has been inserted into the semi-enclosed tailpiece 207 of the clip-slider 200. However, unlike the illustration of FIG. 2B, in FIG. 2C the audio cable 290 is not held between the front portions 222 and 224 of the clip-slider 200. As an option, a wearing user may attach the clip-slider 200 to an item of clothing by opening the clip-slider 200 and inserting a portion of the clothing between the front portions 222 and 224 of the clip-slider 200. For example, as depicted in FIG. 2C, the clip-slider 200 is attached to a collar 284 of a shirt 282 of a wearing user. In this way, the clip-slider 200 may be attached to the shirt 282, such that the audio cable 290 is worn around the back of a wearing user's neck 280, and the audio cable 290 is not pulled from the wearing user's ears, or otherwise separated from the wearing user, when the wearing user moves about. Of course, the clip-slider 200 may be attached to clothing in front of the wearing user, or elsewhere. The wearing user may easily transition between the wearing styles depicted in FIGS. 2B and 2C by removing the audio cable 290 from the semi-enclosed tailpiece 207, or inserting the audio cable 290 into the semi-enclosed tailpiece 207. Accordingly, a single clip-slider 200 may be used to secure the audio cable 290 to a user by cinching the audio cable 290, or by attaching to clothing, according to the user's wearing preferences.

Figure 3A:
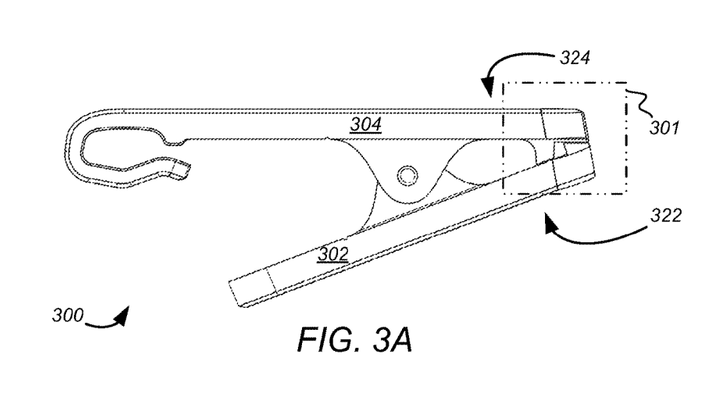
FIGS. 3A and 3B are side views depicting a clip-slider, in accordance with one or more embodiments of the invention.
Figure 3B:
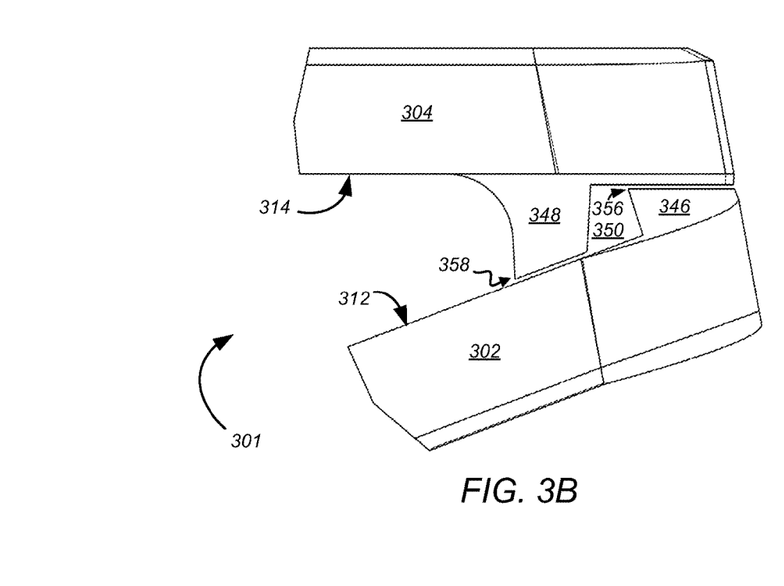

FIGS. 3A and 3B show side views of a clip-slider 300, according to one or more embodiments. Although the elements of the clip-slider 300 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 3A and 3B may be omitted, repeated, and/or substituted. Accordingly, various embodiments may lack one or more of the features shown. For this reason, embodiments of the invention should not be considered limited to the specific arrangements of elements shown in FIGS. 3A and 3B.

FIG. 3A shows a clip-slider 300 in a closed position. As depicted in FIG. 3A, the clip-slider 300 includes a first clip member 302 and a second clip member 304. The first clip member 302 includes a front portion 322, and the second clip member 304 includes a front portion 324. A close-up side view 301 of a front of the clip-slider 300 is shown in FIG. 3B.

Referring to FIG. 3B, the first clip member 302 is shown to include a first tooth 346 extending inward, towards the second clip member 304, from an interior surface 312 of the first clip member 302. Similarly, the second clip member 304 is shown to include a second tooth 348 extending inward, towards the first clip member 302, from an interior surface 314 of the second clip member 304. As depicted in FIG. 3B, the first tooth 346 of the first clip member 302 rests on the interior surface 314 of the second clip member 304 when the clip-slider 300 is closed. Similarly, the second tooth 348 of the second clip member 304 rests on the interior surface 312 of the first clip member 302 when the clip-slider 300 is closed. In one or more embodiments, one or more of the first tooth 346 and the second tooth 348 may be configured to interface in a planar manner with the corresponding interior surface 314 and 312, respectively.

In one or more embodiments, the first tooth 346 and the second tooth 348 define a gap 350 therebetween. The gap 350 between the first tooth 346 and the second tooth 348 may be approximately 0.1 mm to 5 mm wide. For example, the gap 350 may be approximately 0.5 mm wide. Together, the first tooth 346 and the second tooth 348, with the gap 350, define a generally S-shaped path. When the clip-slider 300 is attached to clothing, the clothing may be inserted between the front portions 322 and 324 of the first and second clip members 302 and 304. When clip-slider 300 is closed on the clothing, the clothing may conform to the generally S-shaped path, thereby ensuring that the clip-slider 300 is securely attached to the clothing, and is not accidentally removed.

In one or more embodiments, one or more of the first tooth 346 and the second tooth 348 may be shaped to further aid attachment to fabric, such as clothing. For example, as an option, an interior edge 356 of the first tooth 346 may be defined by an acute angle between two surfaces of the first tooth 346. More specifically, the interior edge 356 may be defined by an acute angle between an interior surface of the first tooth 346 and a surface of the first tooth 346 that interfaces with the interior surface 314 of the second clip member 304. Similarly, as an option, an interior edge 358 of the second tooth 348 may be defined by an acute angle between two surfaces of the second tooth 348. For example, the interior edge 358 may be defined by an acute angle between an interior surface of the second tooth 348 and a surface of the second tooth 348 that interfaces with the interior surface 312 of the first clip member 302. These interior edges 356 and 358 may aid attachment to fabric by pulling inward on the fabric when the clip-slider 300 is attached to the fabric, and by preventing the fabric from being tugged out when the clip-slider 300 is closed.

A number of implementations have been described. Nevertheless, various modifications may be made without departing from the scope of the disclosure. Accordingly, other implementations are within the scope of the following claims.

What is claimed is:

1. A clip-slider, comprising:
    a first clip member comprising a first front portion, the first front portion comprising a first tooth protruding from an interior surface of the first front portion; and
    a second clip member pivotally connected to the first clip member, the second clip member comprising a second front portion and a semi-enclosed tailpiece, the second front portion comprising a second tooth protruding from an interior surface of the second front portion, wherein the semi-enclosed tailpiece extends from a rear portion of the second clip member,
    wherein, in a closed position, the first tooth rests on a first location along the interior surface of the second front portion, and the second tooth rests on a second location along the interior surface of the first front portion, wherein the first location excludes any protrusion of the interior surface of the second front portion, and wherein the second location excludes any protrusion of the interior surface of the first front portion, wherein the first front portion and the second front portion defining a first aperture when the clip-slider is in the closed position, and the semi-enclosed tailpiece defining a second aperture, and wherein a first cross-sectional area of the first aperture is substantially equal to a second cross-sectional area of the second aperture.

2. The clip-slider of claim 1, comprising a spring, wherein the spring biases the first clip member and the second clip member in a closed position.

3. The clip-slider of claim 1, wherein the semi-enclosed tailpiece extends from the rear portion of the second clip member along a longitudinal axis of the second clip member.

4. The clip-slider of claim 3, wherein the semi-enclosed tailpiece curves inwards towards the first clip member.

5. The clip-slider of claim 3, wherein the semi-enclosed tailpiece is outside of an arc of movement of the first clip member.

6. The clip-slider of claim 1, wherein an interior surface of the semi-enclosed tailpiece is polished.

7. The clip-slider of claim 1, wherein the semi-enclosed tailpiece includes a flared terminus.

8. The clip-slider of claim 1, wherein the second clip member includes a ridge protruding from a surface of the second clip member, wherein the ridge is configured to retain an audio cable within an aperture of the semi-enclosed tailpiece.

9. The clip-slider of claim 8, wherein the ridge defines a gap between the second clip member and a terminus of the semi-enclosed tailpiece.

10. The clip-slider of claim 1, wherein the first tooth includes an interior edge that is defined by an acute angle.

11. The clip-slider of claim 1, wherein the second tooth includes an interior edge that is defined by an acute angle.

12. The clip-slider of claim 11, wherein the first tooth and the second tooth define a gap.

13. The clip-slider of claim 12, wherein the first tooth, the second tooth, and the gap define an S-shaped path.

14. The clip-slider of claim 1, wherein the second clip member is longer than the first clip member.

15. The clip-slider of claim 12, wherein the gap comprises a quadrilateral aperture when the clip-slider is closed.

16. The clip-slider of claim 1, further comprising:
a pivot that pivotally connects to the first clip member to the second clip member, wherein the pivot is located within zero to five millimeters (mm) of a plane that intersects both a center of the first aperture and a center of the second aperture.

* * * * *